Patented May 1, 1951

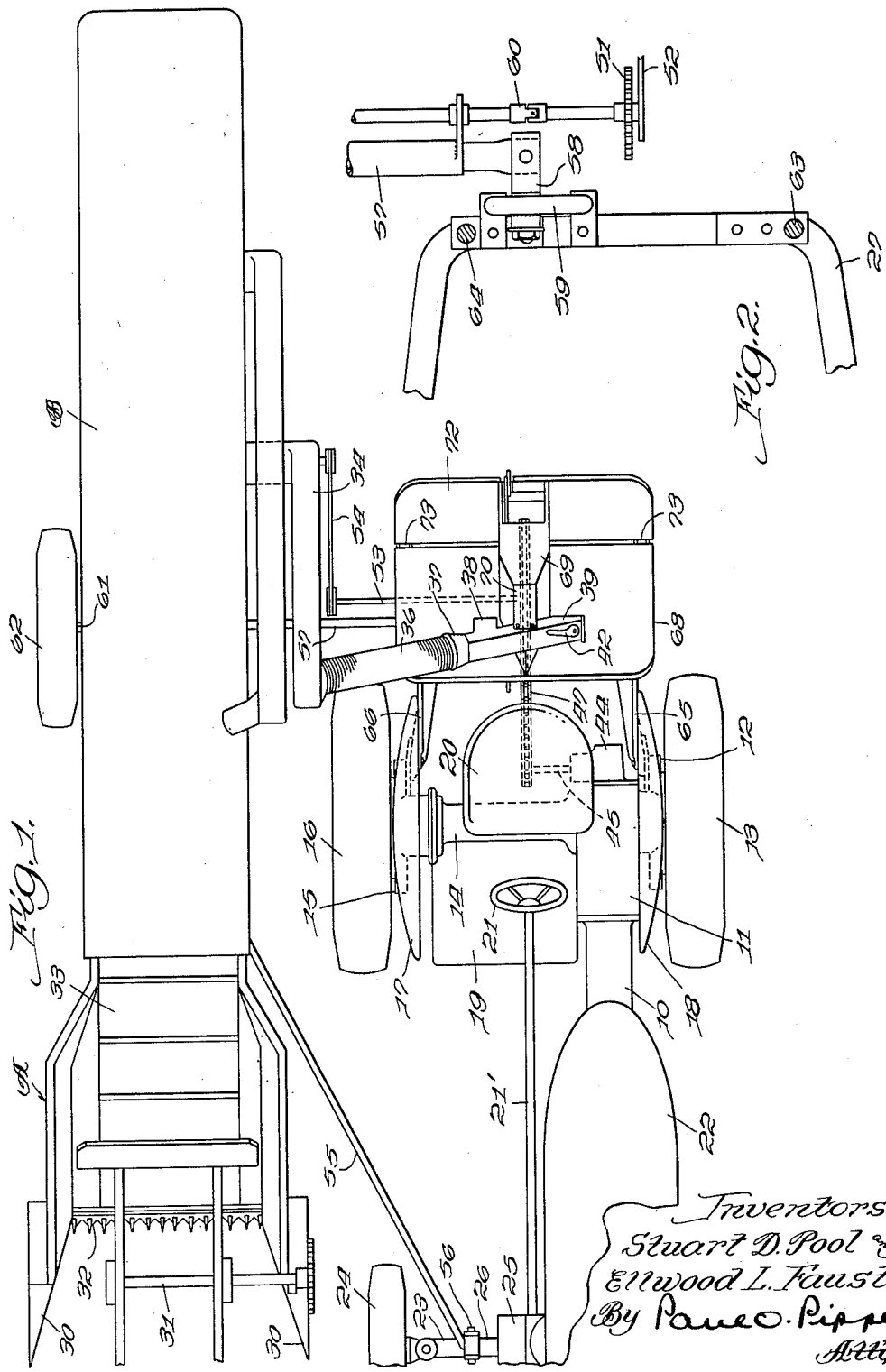

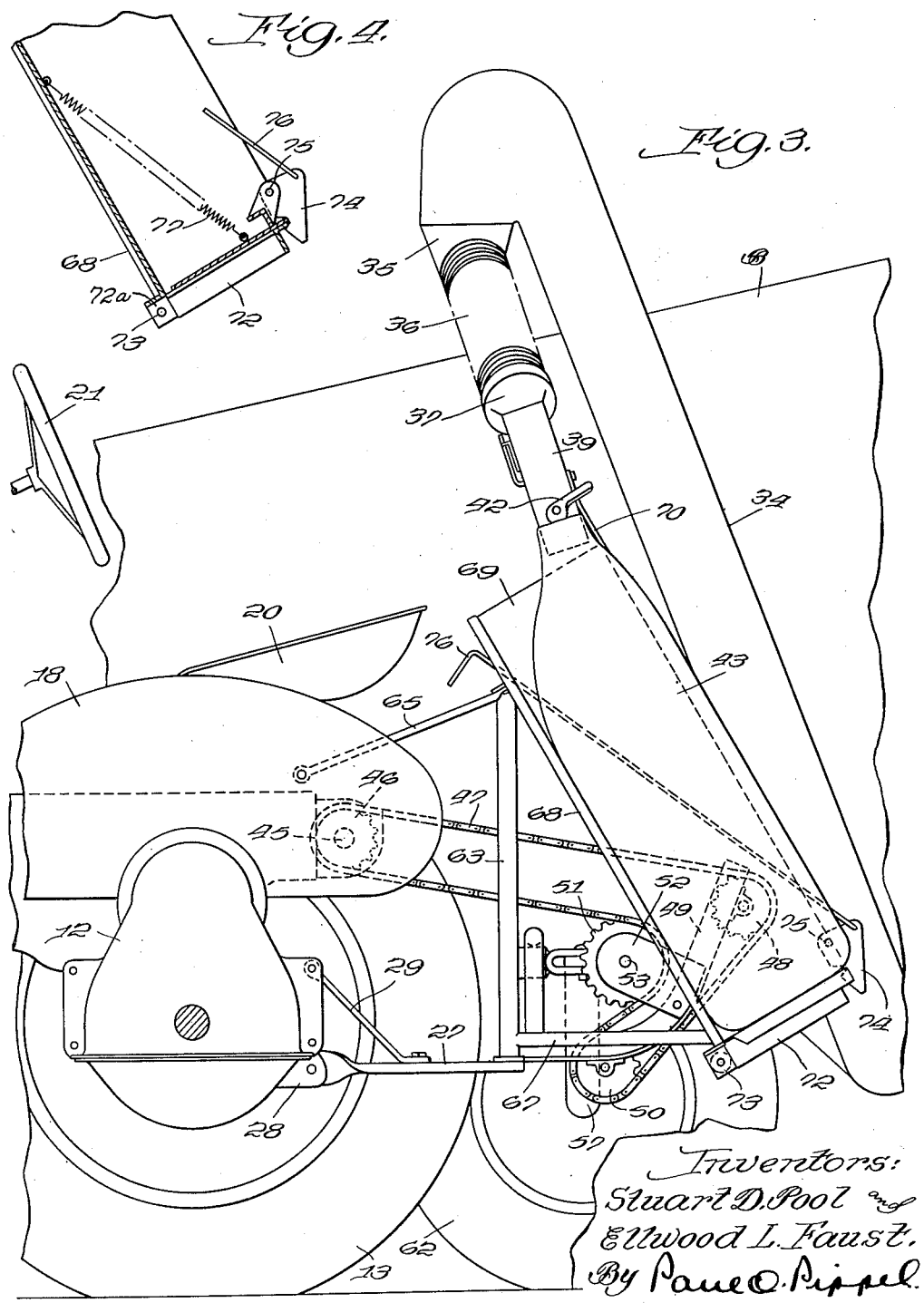

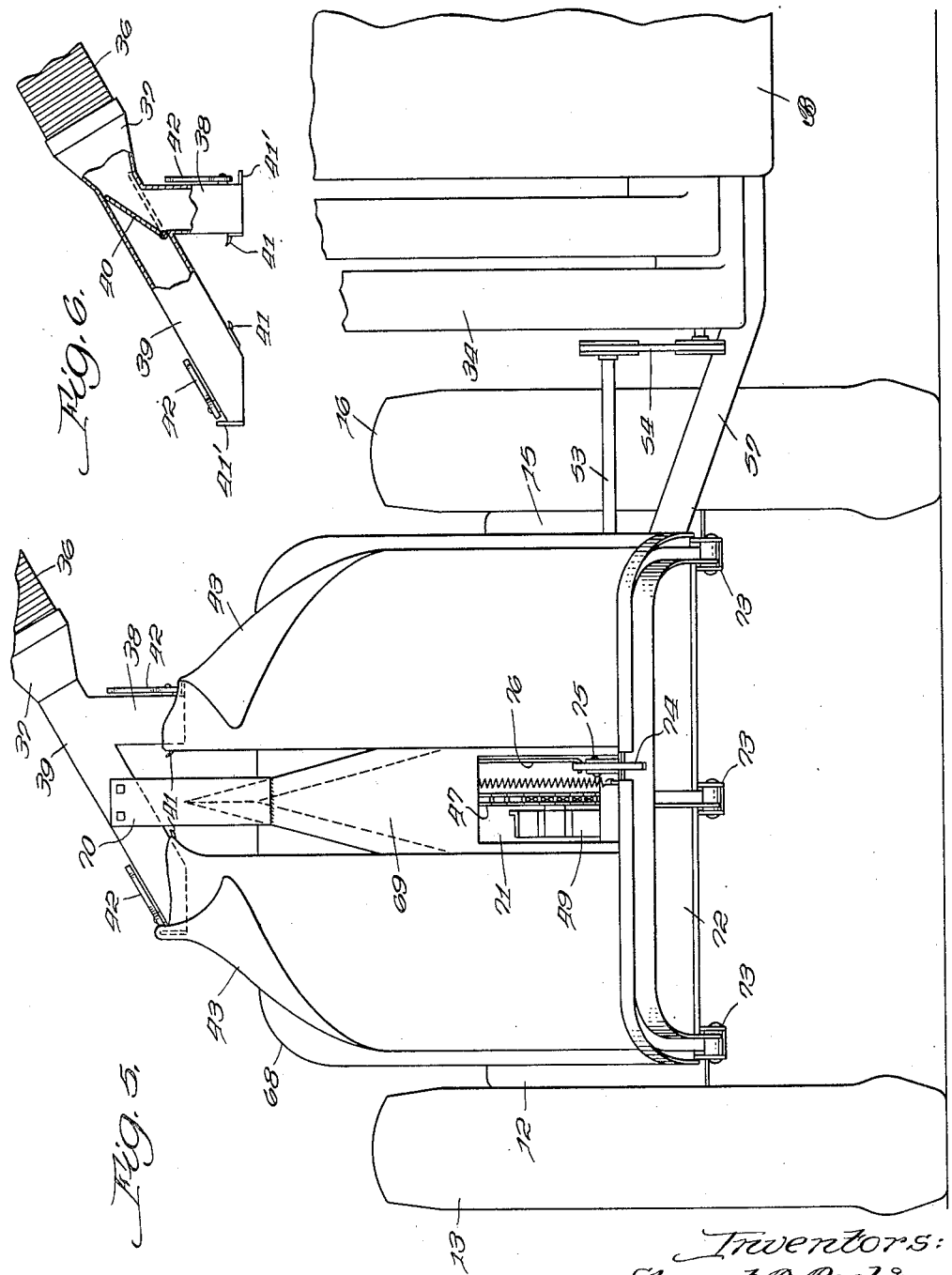

2,551,461

UNITED STATES PATENT OFFICE 2,551,461

BAGGER ATTACHMENT FOR HARVESTERS WITH SWINGABLY MOUNTED BAG SUPPORTS

Stuart D. Pool and Ellwood L. Faust, Moline, Ill., assignors to International Harvester Company, a corporation of New Jersey Application December 26, 1944, Serial No. 569,754

1 Claim. (Cl. 226—58)

This invention relates to a tractor operated harvester. More specifically it relates to a grain bagging attachment for harvesters directly connected to tractors.

In the development of agricultural tractors various types of machines have been mounted directly on the tractor as well as being drawn behind the tractor. Also machines have been constructed which are partially mounted on the tractor, that is, machines which may be considered direct connected in the sense that their movements are controlled by movement of the tractor through means other than a pivotal draw-bar connection. The weight of these machines is carried partially on the tractor and partially on independent ground-engaging wheels. The particular invention is concerned with a side-mounted harvesting machine in which a harvesting machine is positioned alongside a tractor and pivotally connected thereto on two longitudinally spaced and longitudinally alined pivot points. The weight of the harvester is partially carried on the tractor at the pivot points, the remainder of the weight of the tractor being carried on ground-engaging supporting wheels spaced laterally from the tractor. A harvester of this type with a narrow cut for harvesting small fields of grain may be connected on a small size tractor which has sufficient power to operate the mechanism of the harvester from a power take-off and to propel the machine through the field of grain to be harvested. With a small light-weight harvester of this type used in connection with a small tractor, the provision of grain-receiving means on either the harvester or tractor is not feasible due to the weight of any appreciable quantity of grain. Also the provision of any auxiliary wagon or grain-receiving means adds materially to the power required to propel the entire unit and complicates the problems of making short turns with the machine.

In connection with an implement-tractor combination as above set forth, the present invention is concerned with providing a bagging attachment located at the rear of the tractor within easy reach of an operator whereby empty sacks may be readily positioned to receive the grain and whereby the full sacks may be readily dumped to the ground. Suitable means are provided for delivering the grain to the vicinity of the bagging attachment and for delivering the grain into alternate bags whereby the machine may be operated for a considerable period of time without giving attention to the bagging means.

In the drawings:

Figure 1 is a plan view showing a small-size agricultural tractor and a harvester of corresponding size attached thereto;

Figure 2 is an enlarged plan view showing the tractor draw-bar and the connection of the harvester therewith;

Figure 3 is an elevation showing the rear portion of the tractor and the drive extending therefrom to the side-connected harvester. Said view also shows on an enlarged scale the construction of the bagging attachment;

Figure 4 is a sectional detail showing the release mechanism for the filled bags;

Figure 5 is a rear view of the structure shown in Figure 1, a portion of the harvester being omitted; and Figure 6 is a detail sectional view of the bagging spout.

The tractor shown in the drawings is of the type in which the power plant is offset to one side for the purpose of obtaining better vision of the ground being traversed. The tractor has been shown in outline with only certain functional elements thereof being completely illustrated. The tractor includes a narrow body portion 10 connected at its rear end to a transmission housing 11. Said housing is connected at one end by a short depending housing 12 which contains drive mechanism for operating a traction wheel 13. At the other side of the transmission housing 11 an axle extension housing 14 is connected to a depending housing 15 which contains drive mechanism for operating a traction wheel 16. A fender 17 is mounted on the housing 15 and a corresponding fender 18 is mounted on the housing 12. An operator's platform 19 is secured to the housing extension 14 extending forwardly therefrom. An operator's seat 20 is located above the extension housing 14 adjacent a steering wheel 21. Said steering wheel is secured to a steering shaft 21' extending forwardly adjacent the front end for operating a steering mechanism not illustrated in the drawings.

The forward end of the housing 10, as shown, extends under a hood structure 22 which conceals the power plant and other elements of the front end construction of the tractor. Insofar as the present invention is involved, it suffices to illustrate and describe a conventional front axle 23 which is laterally positioned at the front of the tractor. Said axle carries steerable wheels one of which 24 is shown. The steering mechanism of the tractor is included in a housing 25 to which is secured a laterally extending bracket 26 for pivotally supporting the harvester as will hereinafter be described.

A conventional U-shaped draw-bar 27 is secured to suitable brackets 28 extending from the depending housings 12 and 15. Said draw-bar may be rigidly secured in its horizontal position by any suitable bracing structure, such as by brace bars 29 as illustrated in Figure 3.

A harvester is shown located at the side of the tractor, said harvester including a crop-gathering unit A at the forward end and a thresher unit B to which said crop-gathering unit is secured. The crop-gathering unit A as illustrated includes gathering shoes 30, a reel structure 31, cutting mechanism 32, and rearwardly and upwardly extending crop-conveying means 33. The thresher unit B may be of any conventional construction in which the grain is removed and delivered to conveying means including an upwardly extending conveyor housing 34. At its upper end, as shown in both Figures 1 and 3, said conveyor housing is provided with a downwardly extending spout 35 through which the threshed grain is delivered into a downwardly and laterally extending flexible conduit 36. Said conduit is connected at its lower end to a bag filling structure which includes an inlet conduit 37 and spaced apart discharge conduits 38 and 39. A damper 40 is arranged to be shiftable to deliver the grain through either the discharge conduit 38 or the discharge conduit 39. These conduits may also be referred to as bag-filling spouts. Each of the bag-filling spouts is provided with a bag-engaging hook 41 at one side, a ledge 41' at the other side over which the edge of the bag may be lapped, and a cam-like securing member 42. As illustrated in Figures 3 and 5, bags 43 to be filled are partially closed at the top, leaving only an opening sufficient to embrace the filling spouts. The bags are then hooked over the hooks 41 and the ledges 41' and secured in place by the cam-like members 42.

In a construction as illustrated, it is essential that the bags be located adjacent the operator's station and that the securing means for the bags be located within reach of the operator while seated on the tractor, so that the full bags may be released and closed and so that new bags may be secured in grain-receiving position over the filling spouts.

In order to fully illustrate applicants' device, a portion of the harvester drive has been shown particularly in Figures 1, 2, and 3. A gear housing 44 extending from the rear of the transmission housing 18 carries a laterally extending power take-off shaft 45. A gear 46 on said shaft drives a chain 47, the upper flight of which extends rearwardly and over an idler sprocket 48 mounted on an upwardly extending bracket 49. Said chain then extends downwardly over an idler sprocket 50 mounted on a forwardly extending portion of the bracket 49. The chain then extends rearwardly, upwardly and then forwardly around a drive gear 51 which is rotatably mounted on a bracket member 52 extending forwardly from the bracket 49. The gear 51 is secured to a drive shaft 53 which extends transversely, as illustrated in Figure 1, to provide means for driving the mechanism of the harvester by means such as the belt 54 diagrammatically illustrated in Figure 1.

Two frame structure members of the thresher unit B have been illustrated, these members serving to illustrate the means by which the harvester unit is pivotally secured to the tractor. A forwardly extending frame member 55 is pivotally secured at 56 to the bracket 26 previously referred to. A frame member 57 in the form of a pipe is pivotally secured to a pivot member 58, as illustrated in Figure 2. Said pivot member is secured for angular movement to a bracket structure 59 which is rigidly secured to the draw-bar 27. A universal joint 60 is illustrated as positioned in the shaft 53 to provide a flexible drive with the axis of the universal joint being on the axis of the pivot member 58.

To support the portion of the harvester which is not carried by the tractor, an axle extension 61 extends laterally to the outer side of the thresher unit B. Said axle carries a ground wheel 62. By means of this wheel and the pivotal connection of the harvester with the tractor, said harvester is free to follow irregularities in the ground while being positioned at all times by its two-point connection with the tractor.

Two upwardly extending standards 63 and 64 are secured by plates at their bottom ends to the draw-bar 27. Said standards at their upper ends are secured by braces 65 and 66 respectively to the fenders 18 and 17. Rearwardly extending supporting members 67, one of which is shown in Figure 3, together with the standards 63 and 64 support the back wall structure 68 of the bagging attachment. Said back wall structure leans at a sufficient angle forwardly at its upper end to prevent accidental displacement of the bags during jolting when the tractor encounters rough ground conditions. A dividing structure 69 centrally of the wall structure 68 braces the bagging attachment and provides a support at its upper end for the bag-loading spouts 38 and 39. Said support comprises a member 70 secured to the dividing structure 69 and to the spout or conduit 39. The central partition 69 serves the additional purpose of providing clearance for the driving mechanism, particularly the bracket 49, the sprocket 48, and the chain extending around said sprocket. As shown in Figure 3, this drive structure extends rearwardly beyond the surface of the wall structure 68. As shown in Figure 5, an opening 71 is provided over said mechanism.

A bottom 72 is secured by transverse horizontal hinges 73 to the lower end of the inclined wall structure 68. Said bottom is arranged to abut the bottom end of the partition structure 69 and to be engaged and held in position by a latch 74 pivotally secured at 75 on the rear and lower portion of the partition structure 69. When held by said latch the bottom 72 is substantially at right angles to the wall structure 68. An extension 72a of the bottom 72 beyond the hinge 73 acts as a limit stop for downward swinging of the bottom striking the back wall 68. This insures a straight line relationship of the bottom 72 with the wall 68 when the bottom is swung down thus also a continuous uninterrupted slide for the bags being discharged. A rod 76 extending from the latch 74 to a position adjacent the operator's seat 20 is provided for the purpose of unlatching the bottom and dumping the filled bags from the bagging attachment. As illustrated in Figure 4, a tension spring 77 is connected to the bottom 72 and to the wall structure 68 for returning the bottom to a latched position after the bags have been dumped therefrom.

In the operation of the bagging attachment used in connection with a side-mounted harvesting device as above described, the operator carries a supply of empty bags and secures them two at a time to the discharge spouts 38 and 39. This the operator may do by merely turning in his seat without dismounting from the tractor. Bags are provided which are partially closed at the top whereby an opening is available of the proper size for being fitted over the discharge spouts and held in this position by the cam members 42. When the bags are filled the operator again turns from his operating position and either ties the bags or closes them by other suitable means. The rod 76 is then pulled to trip the latch 74 allowing the bottom 72 to drop and deposit the filled bags on the ground. Empty bags are then applied to the filling spouts and the operation is again repeated. By means of this construction, the operator may harvest his crop without carrying a quantity of grain on the tractor or harvester at any time and without wasting any substantial amount of time in filling bags and depositing them on the ground.

It is to be understood that applicants claim as their invention the improvement in bagging of grain gathered by a harvester directly connected to a tractor, in which means are provided adjacent the operator's station for bagging the grain harvested, gathered and threshed by the harvester. It is intended that applicants' invention include all modifications in bagging attachments and their relation with respect to a harvester and a tractor covered by the appended claim.

What is claimed is:

A grain bagging attachment having a delivery spout for feeding grain to the top of a bag and a bag-holding structure, said structure including a side wall inclined downwardly and rearwardly, a bottom normally extending outwardly at a right angle to said side wall in a bag supporting position, said bottom hinged to said side wall and adapted in its uppermost position thereof spaced beneath the delivery spout to support the bottom of the bag, said side wall extending upwardly and forwardly from the hinged bottom to a position adjacent the delivery spout, releasable latch means arranged and constructed to engage and hold the hinged bottom in its bag supporting position, said bottom having an extension beyond its hinged attachment, operator means adapted to effect release of said releasable latch means whereby the hinged bottom swings downwardly and said extension abuts the inclined side wall and holds the bottom in straight line relationship with said inclined side wall for slidably dropping of the bag from and over said hinged bottom, and spring means arranged between said hinged bottom and said side wall for normally urging said bottom toward an up bag supporting position, said spring means being of a strength sufficient to raise the bottom when it has no load but not sufficient to prevent downward swinging of the bottom with a bag load mounted thereon.

STUART D. POOL.
ELLWOOD L. FAUST.

REFERENCES CITED

The following references are of record in the file of this patent:

UNITED STATES PATENTS

| Number | Name | Date |
|---|---|---|
| 215,502 | Bickle | May 22, 1879 |
| 707,544 | Bates | Aug. 26, 1902 |
| 862,231 | Bates | Aug. 6, 1907 |
| 1,595,709 | Coburn | Aug. 10, 1926 |
| 1,702,323 | Stevens et al. | Feb. 19, 1929 |
| 1,830,644 | Dietsch | Nov. 3, 1931 |
| 1,830,645 | Dietsch | Nov. 3, 1931 |
| 1,936,661 | Coultas et al. | Nov. 28, 1933 |
| 2,317,865 | Talbot | Apr. 27, 1943 |
| 2,371,842 | Pool et al. | Mar. 20, 1945 |

FOREIGN PATENTS

| Number | Country | Date |
|---|---|---|
| 282,510 | Great Britain | Dec. 29, 1927 |